United States Patent
Lund et al.

(10) Patent No.: US 6,483,919 B1
(45) Date of Patent: Nov. 19, 2002

(54) METHOD AND ARRANGEMENT FOR ESTABLISHING AN ENCRYPTED MOBILE CONNECTION

(75) Inventors: Lars-Göran Lund, Bromma (SE); Roland Bodin, Spånga (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 09/239,700

(22) Filed: Jan. 29, 1999

(30) Foreign Application Priority Data

Jan. 30, 1998 (SE) ................................. 9800275

(51) Int. Cl.[7] .................. H04L 9/12; H04L 9/16; H04Q 7/22
(52) U.S. Cl. .................. 380/247; 380/249; 380/270; 380/273; 455/414; 455/415
(58) Field of Search .................. 380/247, 248, 380/249, 270, 271, 272, 273; 455/410, 411, 414, 415, 433, 436, 437, 439

(56) References Cited

U.S. PATENT DOCUMENTS 5,841,862 A * 11/1998 Obayashi et al. ............ 380/9
6,029,065 A * 2/2000 Shah .......................... 455/414

FOREIGN PATENT DOCUMENTS

| EP | 0 679 043 | 10/1999 | ............ H04L/12/56 |
| GB | 2 313 989 | 12/1997 | ............ H04L/29/06 |
| WO | 96/32824 | 10/1996 | ............ H04Q/7/32 |

OTHER PUBLICATIONS

Digital Cellular Telecommunications System; Mobile Radio Interface layer 3 specification, GSM 4.08, Sections 3.4.7 and 9.1.9, 1999.
Digital Cellular Telecommunications System; Mobile Station–Base Station System interface; Data Link layer specification GSM 4.06, 1998.
Michel Mouly et al., "The GSM System for Mobile Communications", The GSM System for Mobile Communications, vol. 1992, pp. 391–395.

* cited by examiner

*Primary Examiner*—Justin T. Darrow
(74) *Attorney, Agent, or Firm*—Burns, Doane, Swecker & Mathis, L.L.P.

(57) ABSTRACT

In a method and an arrangement for establishing an encrypted connection between a mobile station and a base transceiver station in a mobile telephone system, the base transceiver station makes sure, before forwarding a cipher mode command message to the mobile station that the mobile station is in multiple-frame-mode.

10 Claims, 1 Drawing Sheet

METHOD AND ARRANGEMENT FOR ESTABLISHING AN ENCRYPTED MOBILE CONNECTION

This application claims priority under 35 U.S.C. §§119 and/or 365 to 9800275-1 filed in Sweden on Jan. 30, 1998; the entire content of which is hereby incorporated by reference.

The invention relates generally to encrypted connections and more specifically to a method and an arrangement for establishing an encrypted connection between a mobile station and a base station in a mobile telephone system.

BACKGROUND

During the establishment phase of a GSM call, the network operator may optionally choose to start encryption of the call by transmitting a cipher mode command (CMC) message [cp. GSM 04.08 Mobile Radio Interface Layer 3 Specification] to the mobile station (MS) to order it to encrypt the call.

If the CMC message is transmitted on the radio interface to the MS under bad radio conditions, the consequence may be that the call establishment attempt fails. Even worse, the radio channel may also be blocked for further use during some time.

Transmission of information frames (I-frames) on radio interface is handled within the Link Access Procedures on the Dm channel (LAPDm) protocol [cp. GSM 04.06 MS-BSS Interface Data Link Layer Specification]. When an I-frame is lost due to bad radio environment, the situation is solved by retransmitting the I-frame. This is a general method that is used for all I-frames with no respect to what message the I-frame contains.

Unlike all other messages sent to the MS, the CMC message is special in that it also controls a function in a base transceiver station (BTS), namely encryption.

The changing of cipher mode in the BTS is done in two steps. First, the cipher mode is changed in the uplink direction, i.e. the direction from the MS to the network.

When the uplink operates using the new cipher mode, the cipher mode is also changed in the downlink direction, i.e. the direction from the network to the MS.

The CMC message orders the MS to use the new cipher setting in both directions. At the same time as the CMC message is sent on the radio interface, the BTS starts deciphering the uplink according to the new cipher mode setting. When the BTS notices that the uplink is enciphered according to the new cipher mode setting, the BTS also starts enciphering the downlink.

A main-signalling-link, i.e. a signalling link within the LAPDm protocol that is used for controlling the MS, is established between the BTS and the MS by the MS by sending a set asynchronous balanced mode (SABM) frame to the BTS. The BTS acknowledges the reception of the SABM frame by sending an unnumbered acknowledge (UA) frame to the MS. When the MS receives the UA frame, it enters the multiple-frame-mode, i.e. the acknowledged operation mode of a LAPDm link where information exchange must be acknowledged by the receiver of the information. If the UA frame was not correctly received by the MS, the MS remains in idle-mode, i.e. the unacknowledged operation mode of a LAPDm link where information exchange need not to be acknowledged by the receiver of the information.

It is absolutely necessary that the MS is in multiple-frame-mode when the CMC message is received. Otherwise, it will be ignored by the MS.

When the BTS has sent the CMC message to the MS, the BTS sets the new cipher mode in uplink and assumes that the MS will use the new cipher mode setting in both directions. However, if the MS is in idle-mode, it will not accept the message and consequently not encrypt the uplink with the requested cipher mode.

Thus, a situation may arise where the BTS decrypts the uplink according to the new cipher mode setting, while the MS continues to use the old cipher mode setting or continues to be in unciphered mode. In this situation, the BTS will not be able to understand the messages that the MS sends uplink.

The BTS interprets the situation that the MS does not acknowledge the I-frame as it should, according to the LAPDm protocol. In this situation, the BTS will repeat the I-frame, which will be ignored by the MS, as it is in idle-mode. When the BTS has repeated the I-frame a predetermined number of times, an error report indicating LAPDm problem will be sent to a base station controller (BSC). The BSC action on this is to release the radio channel.

The MS will repeat the SABM frame. The SABM frame is not encrypted by the MS, but the BTS decrypts it according to the new cipher mode. The BTS will not understand the SABM frame, and consequently not respond to it. When the MS has repeated the SABM frame a predetermined number of times without receiving any response, it will stop trying to establish the link.

Today, there is no way of avoiding the problem of losing the call and blocking the radio channel due to mismatch between the cipher settings in the BTS and MS, respectively.

SUMMARY

The object of the invention is to eliminate the problems described above.

This is attained in that the BTS makes sure, before sending a CMC message to an MS, that the MS considers the main-signalling-link to be in multiple-frame-mode.

Hereby, no calls will be lost and the radio channel will not be blocked for the reason mentioned above.

BRIEF DESCRIPTION OF THE DRAWINGS

The invention will be described more in detail below with reference to the appended drawing, on which FIG. 1 schematically illustrates part of a mobile telephone system.

DETAILED DESCRIPTION

Figure 1:
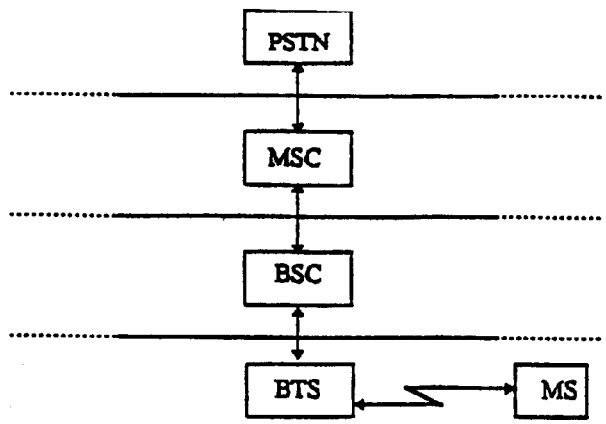

FIG. 1 is a simplified block diagram of a mobile telephone system illustrating the main elements thereof. The illustrated system comprises a mobile services switching centre MSC connected to a public telephone network PSTN. The MSC is connected to a plurality of base station controllers BSC, even if just one BSC is shown, which in their turn are connected to a plurality of base transceiver stations BTS, even if just one is shown, for communication with a plurality of mobile stations MS, only one being shown in FIG. 1.

Figure 2:
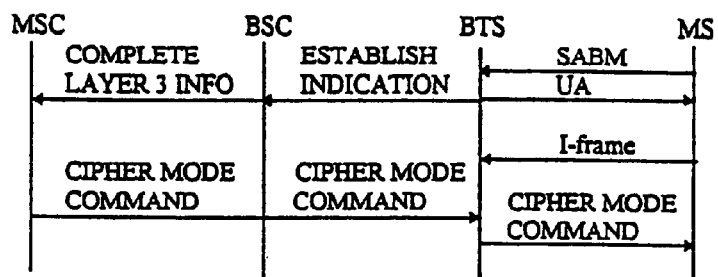
FIG. 2 is a signalling diagram illustrating a first embodiment of the invention.

FIG. 2 is a signalling diagram in accordance with a first embodiment of the invention for establishing an encrypted connection between an MS and a BTS.

First, to establish a signalling link between the BTS and the MS, the MS sends a SABM frame to the BTS. In response to the SABM, an ESTABLISH INDICATION message [cp. GSM 08.58 BSC-BTS Interface Layer 3 Specification] is sent by the BTS to the BSC, and a UA is sent by the BTS to the MS. In response to the ESTABLISH INDICATION message, the BSC, in its turn, sends a COMPLETE LAYER 3 INFORMATION message to the MSC.

According to the embodiment illustrated in FIG. 2, an I-frame is supposed to be received by the BTS from the MS before the CMC message is received by the BTS from the MSC via BSC. The reception by the BTS of an I-frame from the MS is an information indicating that the MS is in multiple-frame-mode. Consequently, when the CMC message arrives at the BTS, the BTS, depending on its setting, is set to or changes its decryption mode in the uplink direction. Moreover, the BTS forwards the CMC to the MS which, depending on its setting, either is set to encryption mode or changes its encryption mode.

Figure 3:
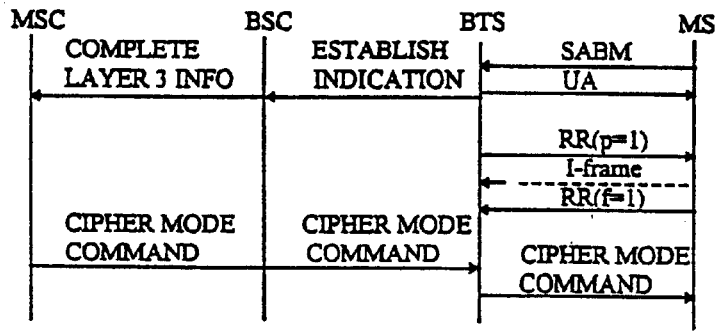
FIG. 3 is a signalling diagram illustrating a second embodiment of the invention.

In accordance with a second embodiment of the invention, illustrated by the signalling diagram in FIG. 3, a poll process is started by the BTS directly after that a UA has been sent to the MS.

As illustrated in FIG. 3, the BTS polls the MS by sending a receive ready RR(poll=1) signal to the MS. If the MS already is in multiple-frame-mode, i.e. the UA has been received by the MS, the MS shall respond by sending a receive ready RR(final=1) signal to the BTS.

When a CMC message arrives at the BTS from the MSC via the BSC and the MS has responded to the receive ready poll by the BTS, indicating that the MS is in multiple-frame-mode, the BTS is set to decryption mode or changes its decryption mode in the uplink direction, and the CMC message is forwarded by the BTS to the MS setting the MS to encryption mode or changing its encryption mode.

As schematically illustrated by means of a dashed arrow in FIG. 3, an I-frame may be received by the BTS from the MS during the poll process. Upon reception of such an I-frame, indicating that the MS is in multiple-frame-mode, the BTS will immediately terminate the poll process and forward the CMC message to the MS upon its arrival.

Figure 4:
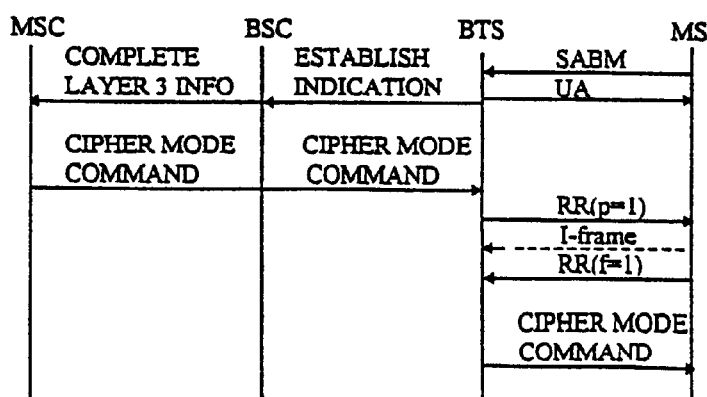
FIG. 4 is a signalling diagram illustrating a third embodiment of the invention.

FIG. 4 is a signalling diagram in accordance with a third embodiment of the invention for establishing an encrypted connection between an MS and a BTS.

As in the embodiments illustrated in FIGS. 2 and 3, the MS sends a SABM frame to the BTS. Also, as in FIGS. 2 and 3, an ESTABLISH INDICATION message is sent by the BTS to the BSC, and a UA is sent by the BTS to the MS. In response to the ESTABLISH INDICATION message, the BSC, as above, sends a COMPLETE LAYER 3 INFORMATION message to the MSC.

A CMC then arrives at the BTS from the MSC via the BSC.

In this embodiment of the invention, the MS is not polled by the BTS beforehand, but the polling of the MS by the BTS is initiated when the BTS receives the CMC.

Thus, as above, a receive ready RR(poll=1) signal is sent by the BTS to the MS in order to find out whether or not the MS is in multiple-frame-mode, i.e. ready to receive the CMC or not.

The BTS may poll the MS until a ready receive RR(final=1) signal is received by the BTS from the MS. As an alternative, a maximum number of repetitions within a certain time interval may be made.

However, as in the embodiment illustrated in FIG. 3, and as schematically illustrated by means of a dashed arrow also in FIG. 4, an I-frame may be received by the BTS from the MS during the poll process. As in FIG. 3, upon reception of such an I-frame, indicating that the MS is in multiple-frame-mode, the BTS will immediately terminate the poll process and forward the CMC message to the MS.

Anyhow, in the embodiment in FIG. 3, the BTS does not forward the CMC to the MS if the MS has not indicated that it is in multiple-frame-mode as detected in the BTS when either the receive ready RR(final=1) signal or an I-frame is received by the BTS from the MS. Upon receiving this receive ready RR(final =1) signal or I-frame from the MS, the BTS is set to decryption mode or changes its decryption mode in the uplink direction and forwards the CMC to the MS which is set to encryption mode or changes its encryption mode.

Thus, only if the BTS receives information from the MS indicating that the MS is in multiple-frame-mode, the BTS is set to or changes its decryption mode in the uplink direction and forwards the CMC to the MS.

Due to the fact that the BTS makes sure, before sending a CMC to an MS, that the MS considers the main-signalling-link to be in multiple-frame-mode, the number of lost calls or blocked radio channels, due to a disturbed radio environment, will be reduced. Moreover, the coverage will be improved. It should also be pointed out that the invention will not have any impact on BTS manufacturing costs. Furthermore, the MSs do not have to be modified.

What is claimed is:

1. In a mobile telephone system comprising a mobile services switching center, a method of establishing an encrypted connection between a mobile station and a base transceiver station, comprising the steps of the mobile station requesting the base transceiver station to establish a signalling link, the base transceiver station confirming to the mobile station that a link is available and informing the mobile services switching center that a link is available for signalling purposes, the mobile services switching center, upon receiving such information, sending a cipher mode command to be forwarded to the mobile station by the base transceiver station, which sets the base transceiver station and sets the mobile station to encryption mode or changes the encryption mode of the mobile station, respectively, wherein only if the base transceiver station receives information indicating that the mobile station is in multiple-frame-mode, the base transceiver station is set to or changes its decryption mode in the uplink direction and forwards the cipher mode command to the mobile station.

2. The method as claimed in claim 1, wherein the base transceiver station is set to or changes its decryption mode in the uplink direction and forwards the cipher mode command to the mobile station upon reception of an I-frame from the mobile station.

3. The method as claimed in claim 1, further comprising the base transceiver station after having confirmed to the mobile station that a link is available, polling the mobile station to determine whether or not the mobile station is in multiple-frame-mode.

4. The method as claimed in claim 1, further comprising the base transceiver station polling the mobile station upon receiving the cipher mode command to determine whether or not the mobile station is in multiple-frame-mode.

5. The method as claimed in claim 3, further comprising the base transceiver station terminating the polling of the mobile station upon reception of an I-frame from the mobile station.

6. In a mobile telephone system comprising a mobile services switching center, an arrangement for establishing an encrypted connection between a mobile station and a base transceiver station, the mobile station having means for requesting the base transceiver station to establish a signalling link, the base transceiver station having means for confirming to the mobile station that a link is available and for informing the mobile services switching center that a link is available for signalling purposes, and the mobile services switching center having means for, upon receiving such information, sending a cipher mode command to be forwarded to the mobile station by the base transceiver station, setting the base transceiver station to decryption mode or changing the decryption mode of the base transceiver station and setting the mobile station to encryption mode or changing the encryption mode of the mobile station, wherein the base transceiver station comprises means for setting itself to decryption mode or changing its decryption mode in the uplink direction and for forwarding the cipher mode command to the mobile station only if the base transceiver station receives information indicating that the mobile station is in multiple-frame-mode.

7. The arrangement as claimed in claim 6, wherein said means for setting the base transceiver station to decryption mode or changing its decryption mode in the uplink direction and for forwarding the cipher mode command to the mobile station are activated upon reception of an I-frame from the mobile station.

8. The arrangement as claimed in claim 6, wherein the base transceiver station comprises means for polling the mobile station to determine whether or not the mobile station is in multiple-frame-mode after having confirmed to the mobile station that a link is available.

9. The arrangement as claimed in claim 6, wherein the base transceiver station comprises means for polling the mobile station upon receiving the cipher mode command to determine whether or not the mobile station is in multiple-frame-mode.

10. The arrangement as claimed in claim 8, wherein the base transceiver station comprises means for terminating the polling of the mobile station upon reception of an I-frame from the mobile station.

* * * * *